3,047,578
SUBSTITUTED RESERPINE AND PROCESS OF MAKING THE SAME

Leon Velluz, Paris, Georges Muller, Nogent-sur-Marne (Seine), and Andre Allais, Paris, France, assignors, by mesne assignments, to Roussel-UCLAF, S.A., Paris, France, a corporation of France
No Drawing. Filed June 27, 1961, Ser. No. 119,785
Claims priority, application France July 29, 1957
1 Claim. (Cl. 260—287)

The present invention relates to a new and valuable 20α-yohimbane compound and more particularly to a substituted 20α-yohimbane compound of the reserpine series and to processes of preparing the same.

In particular this invention relates to a levorotatory (chloroform) substituted reserpine of the structural formula:

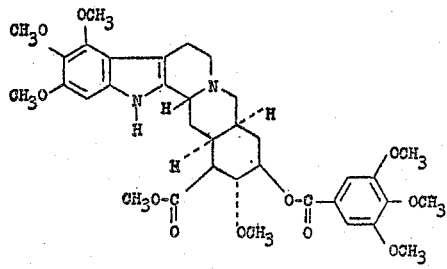

and to processes of preparing the same.

20α-yohimbane compounds of the reserpine series are of considerable interest as physiologically active compounds having noteworthy pharmacodynamic properties. In particular, such compounds are of considerable interest as hypotensive agents. Levorotatory (chloroform) 9,10-dimethoxy reserpine is a physiologically active product of the reserpine family and possesses interesting pharmacodynamic properties. Its hypotensive property is similar to reserpine from which it is derived, but it is almost entirely devoid of an action on the central nervous system.

This application is a continuation-in-part of Serial No. 727,777, filed April 11, 1958.

It is an object of the present invention to obtain a new and valuable substituted 20α-yohimbane of the reserpine series having valuable properties.

Another object of the invention is to obtain a levorotatory (chloroform) substituted reserpine of the structural formula:

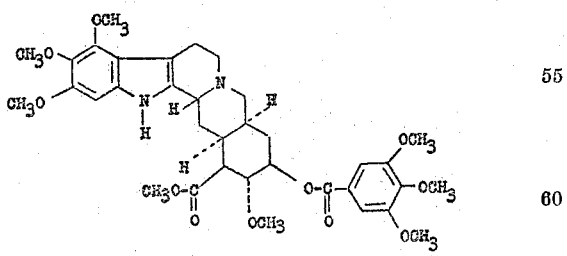

A further object of the invention is to provide a simple and effective process of preparing 9,10-dimethoxy reserpine.

A still further object of the invention is to obtain new intermediates useful in the preparation of said 9,10-dimethoxy reserpine.

These and other objects of the invention will become more apparent as the description thereof proceeds.

In principle, the present invention relates to the levorotatory (chloroform) 9,10-dimethoxy reserpine of Formula I:

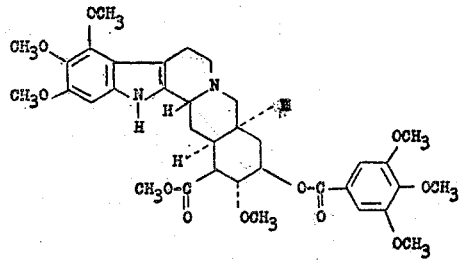

as a new industrial compound.

Levorotatory (chloroform) 9,10-dimethoxy reserpine has a slow melting point of 171–173° C., a specific rotation of $[\alpha]_D^{20} = -114°$ (c.=0.5% in chloroform), is soluble in chloroform, slightly soluble in acetone and insoluble in ether and water.

The compound of the invention is prepared according to the reaction scheme of Table I. Table I is a flow diagram showing the method of producing 9,10-dimethoxy reserpine starting from 4,5,6-trimethoxy tryptamine (Formula III) and the methyl ester of 1β-carboxymethyl-2β-methoxycarbonyl-3α-methoxy-4β-acetoxy-6β-formyl cyclohexane (Formula II).

The methyl ester of 1β-carboxymethyl-2β-methoxycarbonyl-3α-methoxy-4β-acetoxy-6β-formyl cyclohexane is preferably prepared according to United States Patent No. 2,971,978, entitled "Process of Producing 1β-Carboxymethyl-2β-Methoxycarbonyl-3α-Methoxy - 4β - Acetoxy-6β-Formyl Cyclohexane."

TABLE I

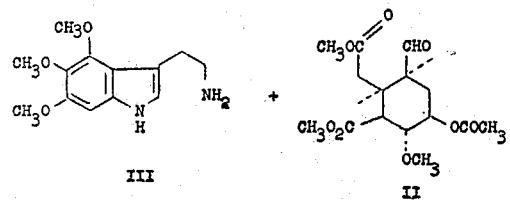

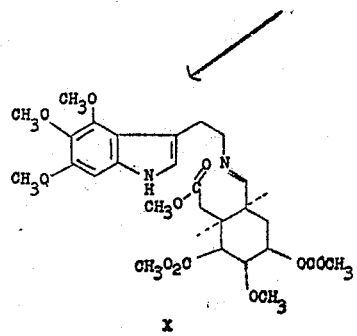

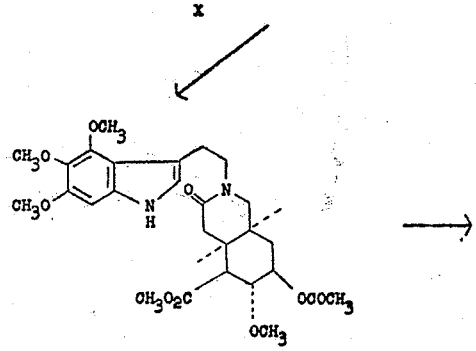

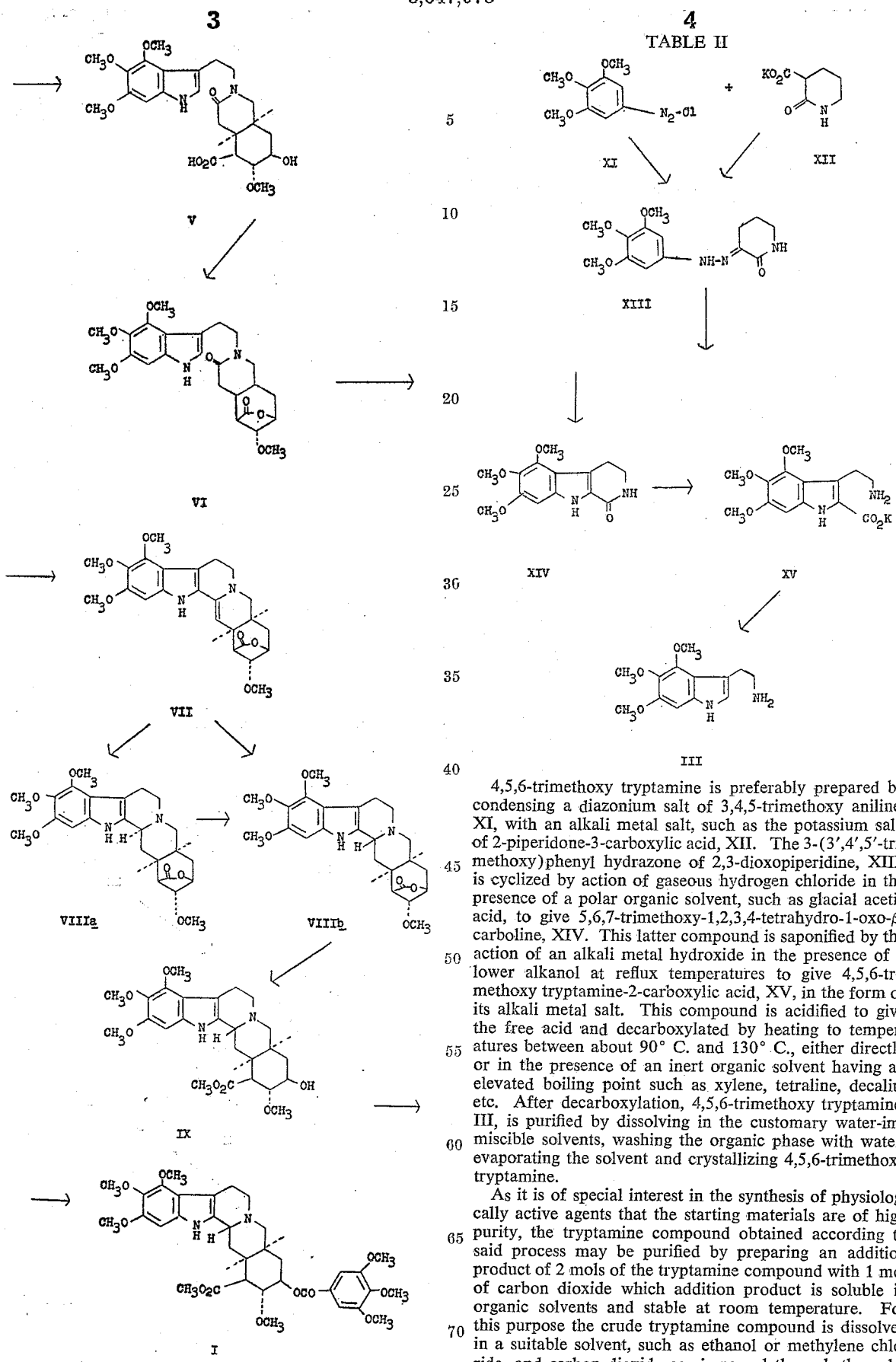

The tryptamine compound of Formula III, 4,5,6-trimethoxy tryptamine is prepared according to the flow diagram of Table II.

4,5,6-trimethoxy tryptamine is preferably prepared by condensing a diazonium salt of 3,4,5-trimethoxy aniline, XI, with an alkali metal salt, such as the potassium salt, of 2-piperidone-3-carboxylic acid, XII. The 3-(3',4',5'-trimethoxy)phenyl hydrazone of 2,3-dioxopiperidine, XIII, is cyclized by action of gaseous hydrogen chloride in the presence of a polar organic solvent, such as glacial acetic acid, to give 5,6,7-trimethoxy-1,2,3,4-tetrahydro-1-oxo-β-carboline, XIV. This latter compound is saponified by the action of an alkali metal hydroxide in the presence of a lower alkanol at reflux temperatures to give 4,5,6-trimethoxy tryptamine-2-carboxylic acid, XV, in the form of its alkali metal salt. This compound is acidified to give the free acid and decarboxylated by heating to temperatures between about 90° C. and 130° C., either directly or in the presence of an inert organic solvent having an elevated boiling point such as xylene, tetraline, decalin, etc. After decarboxylation, 4,5,6-trimethoxy tryptamine, III, is purified by dissolving in the customary water-immiscible solvents, washing the organic phase with water, evaporating the solvent and crystallizing 4,5,6-trimethoxy tryptamine.

As it is of special interest in the synthesis of physiologically active agents that the starting materials are of high purity, the tryptamine compound obtained according to said process may be purified by preparing an addition product of 2 mols of the tryptamine compound with 1 mol of carbon dioxide which addition product is soluble in organic solvents and stable at room temperature. For this purpose the crude tryptamine compound is dissolved in a suitable solvent, such as ethanol or methylene chloride, and carbon dioxide gas is passed through the solution, while keeping the temperature below 40–45° C., until all of the tryptamine is precipitated. The precipitate is filtered off and heated as such or, preferably, in an inert solvent, such as toluene, xylene, or tetraline, at a temperature exceeding 80° C. On cooling the pure tryptamine compound crystallizes.

Condensation of 4,5,6-trimethoxy tryptamine of Formula III with the monocyclic aldehyde of Formula II is preferably carried out in a neutral solvent, such as methylene chloride or tetrahydrofuran, at about room temperature. Thereby a compound of Formula X is obtained. The compound of Formula X is subjected to the action of an alkali metal borohydride such as potassium borohydride in the presence of a lower alkanol such as methanol whereby the double bond of the Schiff base of Formula XII is hydrogenated and ring closure takes place. Thereby the compound of Formula IV is obtained.

This 18β-acetoxy-9,10,11,17α-tetramethoxy-16β - methoxycarbonyl-3-oxo-2,3-seco-20α-yohimbane, IV, is saponified by the action of an alkali metal hydroxide in the presence of a lower alkanol at reflux temperatures to give 18β-hydroxy-9,10,11,17α-tetramethoxy-16β - carboxy - 3-oxo-2,3-seco-20α-yohimbane, V. This latter compound is lactonized by the action of acetic acid anhydride in the presence of an alkali metal acetate such as lithium acetate to give the corresponding 18–16 lactone, VI. The lactone VI is cyclized by refluxing with phosphorus oxychloride and treatment with ammonia to give the 18–16 lactone of 18β-hydroxy-9,10,11,17α-tetramethoxy-16β - carboxy-$\Delta^{3(14)}$-20α-yohimbene, VII. The 18–16 lactone of 18β-hydroxy-9,10,11,17α-tetramethoxy-16β-carboxy - 3β,20α-yohimbane, VIIIb, is obtained from the $\Delta^{3(14)}$ compound VII by reduction with an alkali metal borohydride such as sodium borohydride in the presence of a lower alkanol to give the corresponding 3α compound, VIIIa, which is isomerized with formic acid or by stereospecific reduction of the $\Delta^{3(14)}$ compound, VII, with zinc in an acidic media, preferably acetic acid. Compound VIIIb, is subjected to methanolysis to give 18β-hydroxy-9,10,11,17α - tetramethoxy-16β-methoxycarbonyl-3β,20α-yohimbane, IX.

The compound of Formula IX is then esterified by means of a 3,4,5-trimethoxy benzoic acid derivative such as the chloride or anhydride. When the anhydride is utilized, it is preferably reacted in the presence of a pyridine base and of triethylamine according to the method described in copending application Serial No. 727,782, filed April 11, 1958, and entitled "Process of Esterifying 18-Hydroxy Yohimbanes," now Patent No. 2,926,167. The desired ester of 9,10-dimethoxy reserpine is obtained.

The following examples serve to illustrate the present invention without, however, limiting the same thereto. More particularly, many changes and variations in the reaction temperature and duration, in the nature of the solvents, acids and bases used, in the order of introducing the reaction components into the reaction vessel, in the mode of working up the reaction mixture, and of isolating and purifying the reaction product may be made by those skilled in the art in accordance with the principles set forth herein and in the claims annexed hereto.

The melting points given in the examples are instantaneous melting points determined on the Maquenne block.

*Example I*

PREPARATION OF 4,5,6-TRIMETHOXY TRYPTAMINE, III 9.8 gm. of 3,4,5-trimethoxy aniline are converted into the corresponding diazonium salt by diazotizing by means of 3.7 gm. of sodium nitrite in dilute hydrochloric acid at a temperature between 0° C. and +5° C. After cooling to −5° C., sodium acetate is added as buffer agent and then a solution of the potassium salt of 2-piperidone-3-carboxylic acid; said solution was prepared by saponification of 9.2 gm of 3-carbethoxy-2-piperidone in aqueous potassium hydroxide solution. The mixture of diazonium salt and piperidine compound is stirred for 6 hours while cooled in an ice bath. The precipitated phenyl-hydrazone is filtered with suction, washed with water and several times with acetone. A crude product is obtained in a yield of 57% of the theoretical amount which may be directly used for further reaction. After recrystallization from 45% acetic acid, 2,3-dioxo piperidine-3(3′,4′,5′-trimethoxy)-phenyl hydrazone forms pale yellow crystals which melt at 265° C. with decomposition. The compound is slightly soluble in anhydrous organic solvents but is more soluble therein in the presence of small amounts of water; it is insoluble in ethyl acetate, benzene, and chloroform even on heating.

*Analysis.*—$C_{14}H_{19}O_4N_3$: Molecular weight=293.32. Calculated: C, 57.32%; H, 6.53%; N, 14.33%. Found: C, 57.4%; H, 6.5%; N, 14.1%.

The compound corresponds to Formula XIII. It has not yet been described in the literature.

In order to cause ring closure of said 2,3-dioxopiperidine-3-(3′,4′,5′-trimethoxy)phenyl hydrazone, gaseous hydrochloric acid is passed through a solution of 5.95 gm. of said compound in acetic acid. After 15 minutes, the temperature of the heating bath is raised to 120–125° C. and passage of gaseous hydrochloric acid through the solution is continued for another 15 minutes. After cooling, acetic acid is removed by evaporation to dryness in a vacuum. The residue consisting of 5,6,7-trimethoxy-1,2,3,4-tetrahydro-1-oxo-β-carboline is washed with water. It forms a grayish green powder. The crude product which is obtained in a yield of 70% of the theoretical amount may be used as such in the next reaction step. Recrystallization from acetic acid yields gray crystals which are soluble in alcohol and acetone and insoluble in water and ether. Their melting point is 210–211° C. (with decomposition).

*Analysis.*—$C_{14}H_{16}O_4N_2$: Molecular weight=276.28. Calculated: C, 60.86%; H, 5.84%; O, 23.16%; N, 10.14%. Found: C, 60.7%; H, 5.9%; O, 23.3%; N, 10.4%.

The compound corresponds to Formula XIV. It has not yet been described in the literature.

4,5,6-trimethoxy tryptamine-2-carboxylic acid is prepared by saponification of 3.43 gm. of the crude carboline compound, obtained as described hereinabove, with 6.8 gm. of potassium hydroxide in alcohol. The mixture is refluxed overnight and evaporated to dryness in a vacuum. Decarboxylation is effected by adding to the residue first 10 cc. of concentrated hydrochloric acid and thereafter 45 cc. of dilute hydrochloric acid, heating the mixture in an oil bath to 95° C. for 30 minutes, and increasing the temperature from 95° C. to 120° C. within 45 minutes, whereby the carboxyl group in position 2 of the molecule is split off. When development of carbon dioxide ceases, a dark greenish brown liquid is obtained which is cooled and rendered alkaline by the addition of 30% sodium hydroxide solution. A brownish black oil separates. It is extracted by means of chloroform. The extracts are washed with water. After further purification of the extracts, an oil is obtained which yields 4,5,6-trimethoxy tryptamine on adding water. The yield is 60% of the theoretical amount. The crude tryptamine compound melts at 145° C. After recrystallization from toluene, 4,5,6-trimethoxy tryptamine crystallizes in the form of light brown crystals which melt at 146–147° C., are very soluble in alcohol and acetone, soluble in chloroform, and slightly soluble in ether and benzene.

*Analysis.*—$C_{13}H_{18}O_3N_2$: Molecular weight=250.29. Calculated: C, 62.38%; H, 7.25%; O, 19.18%; N, 11.19%. Found: C, 62.8%; H, 7.2%; O, 19.1%; N, 10.9%.

The compound has not yet been described in the literature.

*Example II*

PREPARATION OF 9,10-DIMETHOXY RESERPINE, I

*Step A: The methyl ester of 18β-acetoxy-9,10,11,17α-tetramethoxy - 16β - methoxycarbonyl - 2,3,3,4 - diseco-$\Delta^{4(21)}$-20α-yohimbene-3-carboxylic acid of Formula X.*—

1.6 gm. of the dextrorotatory (pyridine) 1β-carboxymethyl-2β-methoxycarbonyl - 3α - methoxy - 4β - acetoxy- 6β-formyl cyclohexane are subjected to the action of diazo-methane in methylene chloride. After distillation to dryness in a vacuum, the residue is dissolved in 4 cc. of tetrahydrofuran and a solution of 950 mg. of 4,5,6-trimethoxy tryptamine in 20 cc. of tetrahydrofuran are added thereto. The reaction mixture is allowed to stand at room temperature for half an hour. It is evaporated to dryness in a vacuum. The resulting compound is used without further purification for the next reaction step.

*Step B: The levorotatory 18β - acetoxy - 9,10,11,17α-tetramethoxy-16β -'methoxycarbonyl - 3 - oxo - 2,3 - seco-20α-yohimbane of Formula IV.*—The methyl ester obtained as described hereinabove is dissolved in 10 cc. of methanol and 250 mg. of potassium borohydride are added to said solution. Crystallization is initiated by scratching and the mixture is allowed to stand for several minutes. Excess potassium borohydride is destroyed by the addition of several drops of acetic acid. After cooling in an ice bath, the precipitated crystals are filtered by suction, washed with methanol, and dried. 1.35 gm. (68% of the theoretical amount) of the desired compound of Formula IV melting at 230° C. are obtained. The mother liquors are evaporated to dryness. The residue is dissolved in methylene chloride. After evaporation of the solvent, a resin is obtained which, by acetylation, yields a further amount of 100 mg. of said compound IV.

18β-acetoxy-9,10,11,17α-tetramethoxy - 16β - methoxycarbonyl-3-oxo-2,3-seco-20α-yohimbane melts at 230° C., has a rotatory power of $[\alpha]_D^{20} = -38°$ (c.=0.5% in chloroform) and is soluble in acetone, chloroform, and methanol and insoluble in ether.

*Analysis.*—$C_{27}H_{36}O_9N_2$: Molecular weight=532.57. Calculated: C, 60.89%; H, 6.81%; O, 27.04%; N, 5.26%. Found: C, 60.9%; H, 6.7%; O, 27.4%; N, 5.3%.

The I.R. spectra confirms the structure shown. This compound is not described in the literature.

*Step C: 18β-hydroxy - 9,10,11,17α - tetramethoxy - 16β-carboxy-3-oxo-2,3-seco-20α-yohimbane of Formula V.*—9.3 gm. of the compound of Formula IV obtained as described hereinabove are dissolved in 50 cc. of methanol. The solution is heated under reflux, 50 cc. of aqueous 2 N-sodium hydroxide solution are added thereto, and refluxing is continued for one hour. After cooling and adding water thereto, excess sodium hydroxide is neutralized by the addition of 2 N-hydrochloric acid. After saturation with sodium chloride, the mixture is extracted with ethyl acetate and the combined extracts are washed with a saturated solution of sodium chloride. After filtration, the extracts are evaporated to dryness. 10 gm. of the desired product, which is highly solvated, are obtained thereby. It is used without further purification for the following reaction steps.

*Step D: The levorotatory lactone of 18β-hydroxy-9,10,11,17α-tetramethoxy - 16β -carboxy-3-oxo-2,3-seco-20α-yohimbane, VI.*—10 gm. of raw compound V obtained according to the preceding step are taken up in 50 cc. of acetic acid. 50 cc. of acetic anhydride and 2.5 gm. of lithium acetate are added thereto, and the mixture is heated for 3 hours at 75° C. After cooling and addition of water, the solution is allowed to stand for a period of one hour. The solution is then extracted with methylene chloride. The methylene chloride extracts are combined, washed with water saturated with sodium bicarbonate, then water, dried over magnesium sulfate, and distilled to dryness. 7 gm. of resin are obtained which is crystallized from methanol. The first lot consisting of the lactone VI weighs 3.72 gm. The mother liquors are distilled to dryness and the residue is subjected to chromatography through alumina allowing the separation by elution with methylene chloride of a second lot of 615 mg. (being a total of 54% for the two consecutive steps) of the lactone VI. The levorotatory lactone of 18β-hydroxy-9,10,11,17α-tetramethoxy-16β-carboxy-3-oxo-2,3-seco-20α-yohimbane, VI, has a melting point of 185° C. and a specific rotation $[\alpha]_D^{20} = -77°$ (c.=0.5% in ethanol). The compound which is new, is soluble in chloroform, slightly soluble in methanol and insoluble in ether.

*Analysis.*—$C_{24}H_{30}O_7N_2$: Molecular weight=458.50. Calculated: C, 62.87%; H, 6.60%; O, 24.43%; N, 6.11%. Found: C, 63.0%; H, 6.6%; O, 24.4%; N, 6.2%.

*Step E: Preparation of the lactone of 18β-hydroxy-9,10,11,17α-tetramethoxy - 16β - carboxy-$\Delta^{3(14)}$-20α-yohimbene, VII.*—1.23 gm. of the lactone VI obtained according to the preceding step are heated to reflux for a period of one and a half hours with 4 cc. of phosphorus oxychloride and next distilled to dryness under vacuum. The residue is taken up with a little bit of acetone and 0.5 cc. of water is added thereto while the solution is maintained in an ice bath. Then concentrated ammonia solution is added until the pH reaches 12. The mineral precipitated is dissolved by the addition of 30 cc. of water. The solution is vacuum filtered. The precipitate is washed with water and dried in order to recover 1.24 gm. of a yellow product comprising the lactone VII which is easily decomposed.

This compound is not described in the literature.

*Step F: Preparation of levorotatory lactone of 18β-hydroxy-9,10,11,17α - tetramethoxy-16β-carboxy-3α,20α-yohimbane, VIIIa.*—1.24 gm. of compound VII obtained according to the preceding step are introduced into 4 cc. of methanol. Several drops of concentrated hydrochloric acid are added and the solution is cooled to 0° C. In small amounts sodium borohydride is added until decoloration occurs. In the course of the reduction, methanol is continually added in such a manner as to avoid the formation of a paste. After the addition of water, the solution is allowed to stand for a period of one hour in an ice bath. The precipitate is vacuum filtered, washed with water and with methanol and dried. 1.19 gm. of a product is recovered which is placed in suspension in methanol. Several drops of ammonia are added and the suspension is vacuum filtered. The precipitate is washed with water, dried, and 1 gm. (being 70%) of levorotatory lactone of 18β-hydroxy-9,10,11,17α-tetramethoxy-16β-carboxy-3α,20α-yohimbane, VIIIa, is obtained having a melting point of 264° C. and a specific rotation $[\alpha]_D^{20}$ which varies between —50° and —100° (c.=0.5% in chloroform), caused by a tendency of the compound to isomerize into the 3β-compound. The compound is soluble in chloroform, slightly soluble in methanol and insoluble in ether. The infrared spectra is in accord with the structure shown.

This compound is not described in the literature.

*Step G: Preparation of the dextrorotatory lactone of 18β-hydroxy-9,10,11,17α - tetramethoxy - 16β - carboxy-3β,20α-yohimbane, VIIIb.*—985 mg. of levorotatory lactone of 18β-hydroxy-9,10,11,17α-tetramethoxy-16β-carboxy-3α,20α-yohimbane, VIIIa, obtained according to the preceding step in 4 cc. of formic acid are heated to reflux for a period of a half hour. The solution is next poured into water. Concentrated ammonia is added thereto until the pH is greater than 10 and the solution is extracted with methylene chloride. The extracts are combined, washed and dried and then concentrated. The dextrorotatory lactone of 18β-hydroxy-9,10,11,17α-tetramethoxy-16β-carboxy-3β,20α-yohimbane, VIIIb, crystallizes while hot. On cooling, vacuum filtering and drying, 755 mg. (being 77%) of crystals of lactone VIIIb are obtained, having a melting point of 320° C. and a specific rotation $[\alpha]_D^{20} = +10°$ (c.=0.5% in chloroform). The compound is slightly soluble in chloroform and methylene chloride, insoluble in ether. The infrared spectra confirms the structure.

The product is not described in the literature.

*Step H: Preparation of the dextrorotatory lactone of 18β-hydroxy-9,10,11,17α - tetramethoxy-16β-carboxy-3β, 20α-yohimbane, VIIIb.*—450 mg. of the lactone of 18β- hydroxy-9,10,11,17α-tetramethoxy-16β - carboxy - Δ³⁽¹⁴⁾-20α-yohimbene, VII, obtained according to step E are heated to reflux in 20 cc. of acetic acid. 2.5 gm. of powdered zinc are added in a period of 10 minutes. Then the refluxing is continued for another 5 minutes. The solution which remained yellow is poured on ice. The zinc is eliminated by decantation and ammonia is added until the pH is 12. The solution is then extracted with methylene chloride. The extracts are distilled to dryness and 675 mg. of a resin are obtained which in ethyl acetate deposits 77 mg. of a white product melting at greater than 295° C. comprising the desired dextrorotatory lactone of 18β-hydroxy-9,10,11,17α-tetramethoxy - 16β - carboxy-3β, 20α-yohimbane, VIIIb, but this product is contaminated with the starting material as is shown by the infrared spectra.

Through chromatography, pure compound VIIIb is obtained identical to the product obtained in the preceding example.

*Step I: Preparation of 18β-hydroxy-9,10,11,17α-tetramethoxy - 16β-methoxycarbonyl - 3β,20α - yohimbane, IX.*—A mixture of 400 mg. of the dextrorotatory lactone of 18β-hydroxy-9,10,11,17α-tetramethoxy-16β-carboxy-3β, 20α-yohimbane, VIIIb, obtained according to step G, 11 cc. of methanol and 4 cc. of methanol containing 1 mg. of sodium per cc. is heated to reflux for a period of 2 hours. At the end of this time, the solution is concentrated to 1 cc., extracted with methylene chloride and the extracts distilled to dryness. The raw colorless residue comprises 18β - hydroxy - 9,10,11,17α-tetramethoxy-16β-methoxycarbonyl-3β,20α-yohimbane, IX, and is used directly for the next step of the synthesis.

This compound is not described in the literature.

*Step J: Preparation of levorotatory 9,10-dimethoxy reserpine, X.*—The 18β-hydroxy-9,10,11,17α-tetramethoxy-16β-methoxycarbonyl-3β,20α-yohimbane, IX, obtained according to the preceding step, starting from 400 mg. of the lactone VIIIb is taken up in 4 cc. of pyridine. 1 gm. of 3,4,5-trimethoxybenzoyl chloride is added and the mixture is heated in a closed vessel for 16 hours at 75° C. After cooling, 2 cc. of water are added and the solution is allowed to stand for 1 hour. 20 cc. of water are again added and the solution is extracted with methylene chloride. The extracts are washed with hydrochloric acid and water, next with ammonia and water. The extract is distilled to dryness. The residue is taken up in methanol to which several drops of 2 N-sulfuric acid are added. The sulfate of 9,10-dimethoxy reserpine, X, crystallizes. It is vacuum filtered, washed with methanol and the whitish crystals are taken up in acetone. On addition of ammonia and water, the base, which is liberated, is vacuum filtered, dried at 90° C. and 410 (being 77%) of 9,10-dimethoxy reserpine are recovered having a slow melting point of 171–173° C. This product occurs in the form of colorless crystals, soluble in chloroform, slightly soluble in acetone and insoluble in ether and water, and has a specific rotation $[\alpha]_D^{20} = -114°$ (c.=0.5% in chloroform).

*Analysis.*—$C_{35}H_{44}O_{11}N_2$: Molecular weight=668.73. Calculated: C, 62.86%; H, 6.63%; O, 26.32%; N, 4.19%. Found: C, 62.6%; H, 6.9%; O, 26.7%; N, 4.2%.

The infrared spectra confirms the given structure. This compound is not described in the literature.

Of course, many changes and variations in the starting materials used, the reaction conditions, reaction temperature and duration, the solvents employed, the methods used for isolating and purifying the intermediate and final reaction products, and the like, may be used by those skilled in the art in accordance with the principles set forth herein and in the claim annexed hereto.

We claim:

Levorotatory (chloroform) 9,10-dimethoxy reserpine of the formula:

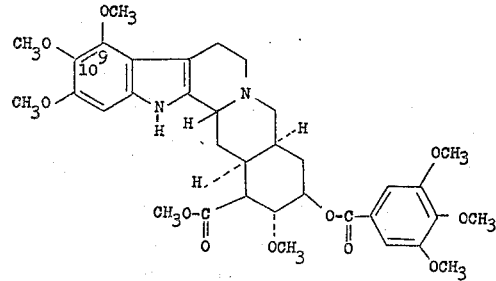

No references cited.